United States Patent
Meinert (10) Patent No.: US 9,752,336 B2
(45) Date of Patent: Sep. 5, 2017

(54) SYSTEMS AND METHODS FOR CONTROLLING AN IMPLEMENT OF A MACHINE UTILIZING AN ORIENTATION LEVELING SYSTEM

(71) Applicant: Caterpillar Inc., Peoria, IL (US)

(72) Inventor: Andrew D. Meinert, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/019,488

(22) Filed: Feb. 9, 2016

(65) Prior Publication Data
US 2017/0226758 A1    Aug. 10, 2017

(51) Int. Cl.
| | |
|---|---|
| *E04G 21/04* | (2006.01) |
| *G05D 3/12* | (2006.01) |
| *B33Y 30/00* | (2015.01) |
| *B33Y 50/02* | (2015.01) |

(52) U.S. Cl.
CPC ..... *E04G 21/0463* (2013.01); *E04G 21/0436* (2013.01); *G05D 3/12* (2013.01); *B33Y 30/00* (2014.12); *B33Y 50/02* (2014.12)

(58) Field of Classification Search
CPC .............................................. E04G 21/0463
See application file for complete search history.

(56) References Cited

U.S. PATENT DOCUMENTS

| | | |
|---|---|---|
| 5,363,304 A | 11/1994 | Awano et al. |
| 8,065,060 B2 | 11/2011 | Danko |
| 8,145,355 B2 | 3/2012 | Danko |
| 8,644,964 B2 | 2/2014 | Hendron et al. |
| 2013/0180744 A1 | 7/2013 | Favreau et al. |
| 2015/0021830 A1 | 1/2015 | Yerazunis et al. |

OTHER PUBLICATIONS

"STIC Search Report—U.S. Appl. No. 15/019,488", USPTO, Mar. 15, 2017 accessed Apr. 13, 2017.*

* cited by examiner

*Primary Examiner* — Alison L Hindenlang
*Assistant Examiner* — Jamel M Nelson
(74) *Attorney, Agent, or Firm* — Miller, Matthias & Hull (57) ABSTRACT

A control system for an implement associated with a machine, the machine operating on a work surface lying in a surface plane, is disclosed. The system includes a base plate attached to the machine, the base plate establishing a plate plane and the orientation of the plate plane alters with changes in orientation of the base plate. The system may further include an orientation leveling system which includes an orientation sensor, one or more plate actuators for altering orientation of the base plate, and an electronic controller. The electronic controller is configured to determine if the plate plane is substantially parallel with the surface plane and actuate the one or more actuators to alter orientation of the base plate to position the base plate such that the plate plane is substantially parallel with the surface plane, if the plate plane is not substantially parallel with the surface plane.

20 Claims, 6 Drawing Sheets

SYSTEMS AND METHODS FOR CONTROLLING AN IMPLEMENT OF A MACHINE UTILIZING AN ORIENTATION LEVELING SYSTEM

TECHNICAL FIELD

The present disclosure generally relates to control systems for implements associated with machines and, more particularly, to implement control systems that utilize an orientation leveling system.

BACKGROUND

Work machines, such as excavators and tele-handlers, may be used to control implements in order to perform various functions. Such implements may be utilized for a variety of tasks including, but not limited to, additive construction, loading, compacting, lifting, brushing and may include, for example, additive construction implements, extruders, buckets, compactors, forked lifting devices, brushes, grapples, cutters, shears, blades, breakers, hammers, augers, and the like.

For controlling implements and their associated machines, various control systems are utilized to manually, autonomously, or semi-autonomously control movement of the work implement along a plurality of linear axes and/or to rotate implements about a plurality of rotational axes. Such control systems may utilize a controller to receive instructions from various sources (e.g., user controls, a memory, a remote control, etc.) and determine controls to be execute via the control system. The control systems send signals to elements associated with the controller, such as motors or actuators, to position the implement in accordance with the determined controls.

In some control systems, a structure of the machine (e.g., a crane of an excavator) may be utilized by and actuated by the control system to control the position of the implement. These systems may use one or more actuators to control gross movement of the machine, while positioning the implement. However, control via such machine-associated components may not provide the desired control accuracy for all types of implements.

Some modern implement control systems, such as the control systems disclosed by U.S. Pat. No. 8,644,964 ("Method and System for Controlling Movement of an End Effector on a Machine"), may employ control schemes that transmit separate signals for coarse movement of a machine to the larger, coarse moving elements of the control system (e.g., control of a crane of an excavator) and separate signals for fine movement of the machine to other elements of the control system that are more directly associated with the implement. For controlling the fine movements of an implement in the system of the '964 patent, the system utilizes a multi-axis robot attached to an excavator.

However, while such a multi-axis robot may be able to control fine movements of a machine, such robots may be cost prohibitive and also may not have the durability required for extensive use on a construction site. Therefore, alternative, cost effective, durable control systems and methods which utilize orientation leveling systems are desired.

SUMMARY

In accordance with one aspect of the disclosure, a control system for an implement associated with a machine is disclosed. The machine operates on a work surface and the work surface lies in a surface plane. The system may include a base plate attached to the machine, the base plate establishing a plate plane and the orientation of the plate plane alters with changes in orientation of the base plate. The system may further include an orientation leveling system which includes an orientation sensor configured to determine initial orientation information for the base plate, the initial orientation information being relative to the surface plane. The orientation leveling system may further include one or more plate actuators for altering orientation of the base plate and a first electronic controller. The first electronic controller may be configured to receive the initial orientation information from the sensor, determine if the plate plane is substantially parallel with the surface plane, and actuate the one or more actuators to alter orientation of the base plate to position the base plate such that the plate plane is substantially parallel with the surface plane, if, based on the initial orientation information, the plate plane is not substantially parallel with the surface plane. The system may further include a multi-axis control system, which includes a plurality of axis actuators, each of the plurality of axis actuators configured to position the implement along an axis relative to the plate plane, and a second electronic controller configured to actuate the plurality of axis actuators to position the implement.

In accordance with another aspect of the disclosure, an effector for controlling an additive construction implement during an additive construction operation on a work surface is disclosed. The work surface lies in a surface plane. The effector may include a base plate for attachment to a machine, the base plate including a plate surface and establishing a plate plane, wherein orientation of the plate plane alters with changes in orientation of the base plane. The effector may include an orientation sensor configured to determine initial orientation information for the base plate, wherein the initial orientation information is relative to the work surface. The effector may include one or more plate actuators for altering orientation of the base plate and an electronic controller. The electronic controller may be configured to receive the initial orientation information from the sensor, determine if the plate plane is substantially parallel with the surface plane, and actuate the one or more actuators to alter orientation of the base plate to position the base plate such that the plate plane is substantially parallel with the surface plane, if, based on the initial orientation information, the plate plane is not substantially parallel with the surface plane. The effector may further include a plurality of axis actuators, wherein each of the axis actuators is configured to position the additive construction implement along an axis relative to the plate plane.

In accordance with yet another aspect of the disclosure, a method for controlling an implement associated with a machine during an operation, utilizing an effector which connects the implement to the machine, is disclosed. The effector may include a base plate that establishes a plate plane, wherein orientation of the plate plane altering with changes in orientation of the base plate, one or more plate actuators, and a plurality of axis actuators. The machine may operate on a work surface, wherein the work surface lies in a surface plane. The method may include, using an orientation sensor operatively associated with the base plate, determining initial orientation information for the base plate. The method may include, using one or more electronic controllers, determining if the plate plane is substantially parallel with the surface plane based on the initial orientation information. The method may include, using the one or more electronic controllers, controlling the one or more plate actuators to alter the orientation of the base plate such that the plate plane is substantially parallel with the surface plane, if the plate plane is not substantially parallel with the surface plane. The method may include, using the one or more electronic controllers, controlling the plurality of axis actuators to position the implement, each of the plurality of axis actuators positioning the implement along an axis relative to the plate plane.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
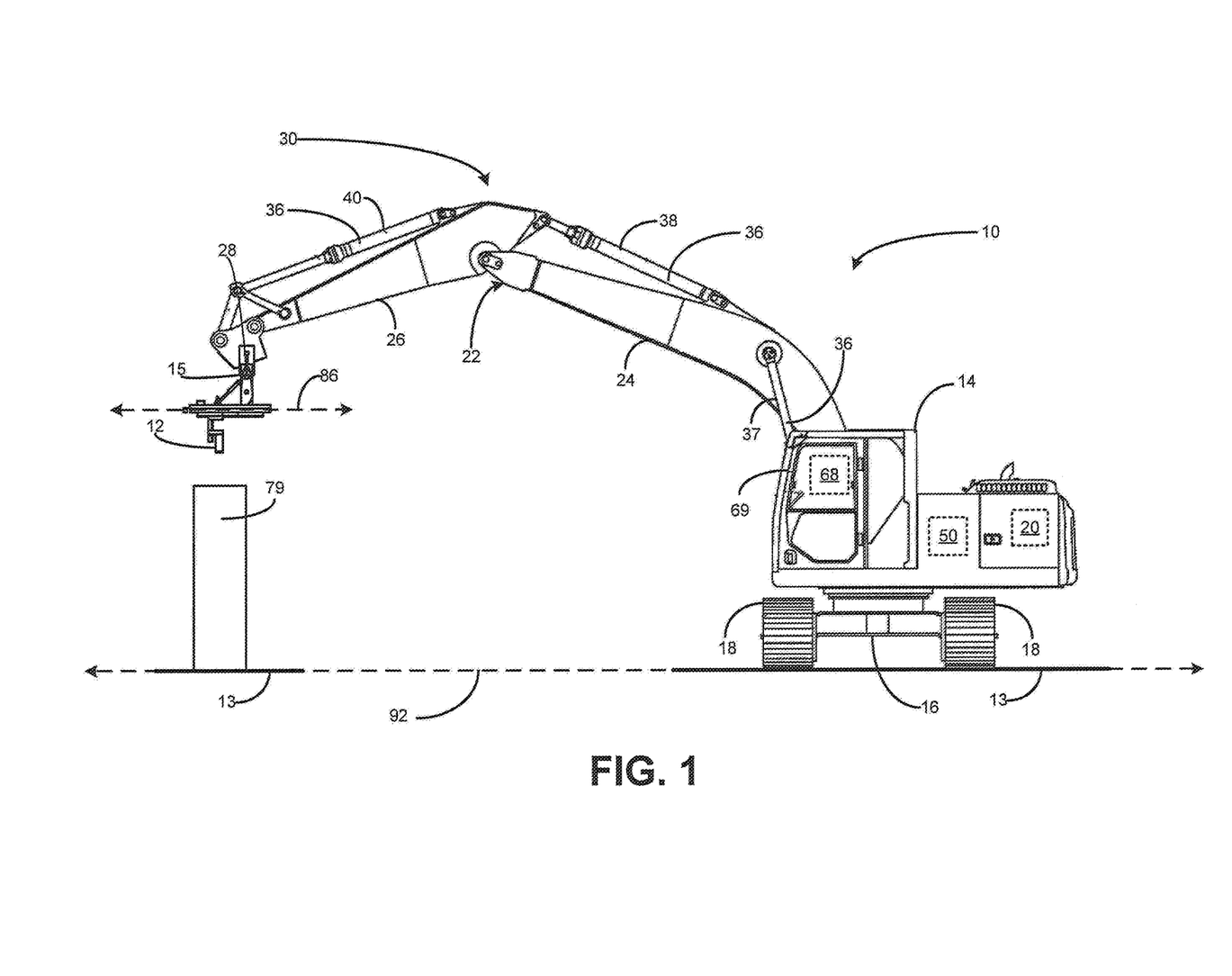
FIG. 1 is a side view of an example machine, including a control system, in accordance with an embodiment of the present disclosure.

Turning now to the drawings and with specific reference to FIG. 1, a machine 10, utilizing an implement 12, is illustrated in accordance with the teachings of the present disclosure. While the machine 10 in FIG. 1 is depicted, generally, as an excavator-type machine, the teachings of the present disclosure may relate to other work machines that employ control systems for an implement associated with said machine. The term "machine" as used herein may refer to any machine that performs some type of operation associated with an industry such as construction, mining, farming, transportation, or any other industry known in the art. For example, the machine 10 may be a construction machine, such as a wheel loader, excavator, dump truck, backhoe, motor grader, material handler, tele-handler, or the like. Moreover, the implement 12 connected to the machine may be utilized for a variety of tasks including, but not limited to, additive construction, loading, compacting, lifting, brushing and may include, for example, additive construction implements, extruders, buckets, compactors, forked lifting devices, brushes, grapples, cutters, shears, blades, breakers, hammers, augers, and the like. The machine 10 and implement 12 operate, in conjunction, to perform tasks on a work surface 13.

As depicted in FIG. 1, the machine 10 may include a housing 14 disposed on top of and supported by an undercarriage 16. The undercarriage 16 may be associated with one or more ground engaging devices 18, which may be used for mobility and propulsion of the machine 10. The ground engaging devices 18 are shown as a pair of continuous tracks; however, the ground engaging devices 18 are not limited to being continuous tracks and may additionally or alternatively include other ground engaging devices such as rotatable wheels. A power system 20 may provide power to the propel or otherwise move the ground engaging devices 18 and may include one or more power sources, such as internal combustion engines, electric motors, fuel cells, batteries, ultra-capacitors, electric generators, and/or any power source which would be known by a person having ordinary skill in the art. Such a power system 20 may further be used to power various motions of the implement 12 or any other elements and control systems associated with the machine 10 and/or implement 12.

For controlling coarse movements the implement 12, the machine 10 may further include a crane 22, which may include a boom 24 operatively coupled with a stick 26. The implement 12 may be attached to the crane 22 at, for example, a distal end 28 of the stick 26. As shown, the implement 12 is attached to the distal end 28 of the stick 26 via an effector 15, which may be used to control fine movements of the implement 12. For positioning the implement 12, the crane 22 and, as associated elements, the boom 24 and stick 26, may be controlled by a control system 30.

Figure 2:
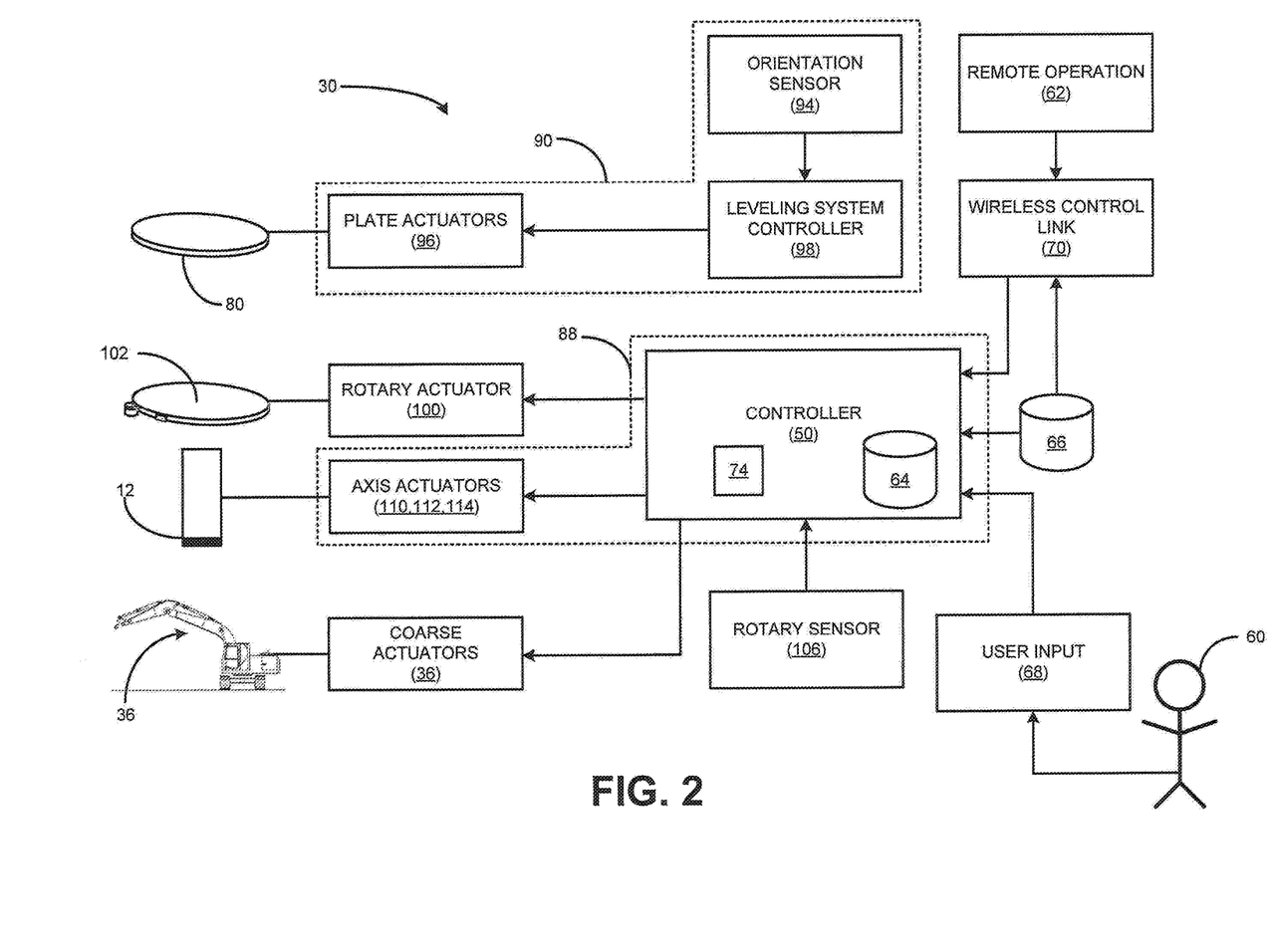
FIG. 2 is a schematic diagram of the control system of FIG. 1, in accordance with an embodiment of the present disclosure.

With reference to both FIG. 1 and the schematic depiction of the control system 30 of FIG. 2, the control system 30 may include a plurality of coarse control actuators 36 for positioning and/or otherwise moving the implement 12. The plurality of coarse control actuators 36 may include, but are not limited to including, hydraulic actuators, motors, or any other suitable device for receiving instructions to actuate a component of the machine 10, the implement 12, or any other component associated with the machine 10 which may affect motion of the implement 12. The plurality of coarse control actuators 36 may include one or more boom actuator(s) 37 for rotating, raising, lowering, and/or otherwise positioning the boom 24 relative to the housing 14 when said boom actuator(s) 37 are actuated. For controlling positioning of the stick 26 relative to the boom 24, the plurality of coarse control actuators 36 may include one or more stick actuator(s) 38, which may rotate, raise, lower, and/or otherwise position the stick upon actuation. The plurality of coarse control actuators 36 may further include implement actuator(s) 40 for controlling coarse positioning of the implement 12. Implement actuator(s) 40 may rotate, raise, lower, and/or otherwise position the implement 12 upon actuation.

To provide signals to the plurality of coarse control actuators 36 for actuation, the control system 30 may include, or be otherwise operatively associated with, a controller 50. The controller 50 is operatively associated with the control system 30 and its associated elements, which include, but are not limited to including, the coarse control actuators 36. The controller 50 may further be used to control the effector 15 for controlling fine movements of the implement 12. As such, the controller 50 may be operatively associated with elements of the effector 15, including, but not limited to, actuators, sensors, and the like.

The controller 50 may be used to control the implement 12 in a variety of autonomous, semi-autonomous, or manual modes. As used herein, an implement 12 of a machine 10 operating in an autonomous manner operates automatically based upon information received from various sensors without the need for human operator input. Further, an implement 12 of a machine 10 operating semi-autonomously may include an operator 60, either within the machine 10 or remotely, who performs some tasks or provides some input while other tasks are performed automatically based upon information received from various sensors. An implement 12 of a machine 10 being operated manually is one in which an operator 60 is controlling all or essentially all of the direction, speed and manipulating functions of the implement 12 of the machine 10. An implement 12 of a machine 10 may be operated remotely by an operator (e.g., a remote operation 62) in either a manual or semi-autonomous manner.

Operation of the implement 12, in any of the above referenced manners, may be executed by the controller 50. The controller 50 may be any electronic controller or computing system including a processor which operates to perform operations, execute control algorithms, store data, retrieve data, gather data, and/or any other computing or controlling task desired. The controller 50 may be a single controller or may include more than one controller disposed to control various functions and/or features of the implement 12 and the machine 10. Functionality of the controller 50 may be implemented in hardware and/or software and may rely on one or more data maps relating to the operation of the machine 10 and the implement 12. To that end, the controller 40 may include internal memory 64 and/or the controller 50 may be otherwise connected to external memory 66, such as a database or server. The internal memory 64 and/or external memory 66 may include, but are not limited to including, one or more of read only memory (ROM), random access memory (RAM), a portable memory, and the like. Such memory media are examples of nontransitory memory media.

User input 68 may be included with the control system 30 so that the operator 60 may have the ability to operate/control the implement 12 of the machine 10. For example, user input 68 may be provided within a cab 69 of the housing 14 of the machine 10, wherein the operator 60 may provide commands for the implement 12 when the machine 10 is operating in either a manual or semi-autonomous manner. The user input 68 may include one or more input devices through which the operator 60 may issue commands to control the implement 12 of the machine 10 by employing one or both of the coarse control actuators 36 and the effector 15 of the control system 30.

Additionally or alternatively, the control system 30 may include a wireless control link 70 which is connected to a wireless network. Via the wireless control link 70, commands may be given to the implement 12 via the controller 50 from a remote operation 62 (e.g., a command center, a foreman's station, and the like). Further, information may be accessed from and/or stored to the external memory 66 using the wireless control link 70. In certain embodiments, control of the implement 12 via the control system 30 may be distributed such that certain functions are performed at the machine 10 level (e.g., by the operator 60 utilizing the user input 68) and other functions are performed via remote operation 62.

Further, the control system 30 may be configured to execute an implement control plan 74. The implement control plan 74 may be instructions stored on at least one of the internal memory 64 and/or the external memory 66 and executed by the controller 50. The implement control plan 74 may be influenced by elements of the control system 30, such as any input or feedback from the user input 68, the remote operation 62, or any other conditions or controls associated with the implement 12 or the machine 10. The implement control plan 74 may include one or more passes for a given task associated with the implement 12.

The implement control plan 74 includes both coarse control signals and fine control signals. The coarse control signals may be transmitted from the controller 50 to one or more of the coarse control actuators 36. The coarse control actuators 36, upon receiving the coarse control signals 76, may be actuated to execute coarse movements of the implement 12 in accordance with the implement control plan 74. Similarly, the fine control signals may be transmitted from the controller 50 to the effector 15. Upon receiving the fine control signals, the effector 15 may be actuated to perform fine movements of the implement 12 in accordance with the implement control plan 74. "Fine movements" may be any movement of the implement 12 that has a range of motion that is less than the range of motion of the coarse movements.

For example, the implement control plan 74 may execute instructions for additive construction using the machine 10 and the implement 12. Additive construction or manufacturing, also often referred to as three-dimensional (3-D) printing, is a process of creating three-dimensional structures from a digital plan or design file. Such additive construction plans and/or designs can be transformed into cross-sections and used to form successive layers to be laid by an additive construction device. The implement control plan 74 may include such digital plans and/or design files. In such examples, the implement 12 may be an additive construction device (e.g., an extruder) for laying down successive layers of material to construct a structure 79. In such an implement control plan 74, instructions may include tool path instructions for the implement 12 that are generated based on a digital, three-dimensional model. The instructions may include successive layers of material to be laid until construction of the structure 79 to be manufactured is completed. In such applications, precise control of the implement 12, using the control system 30, is required to properly and accurately lay the successive layers to construct the desired structure.

Figure 3:
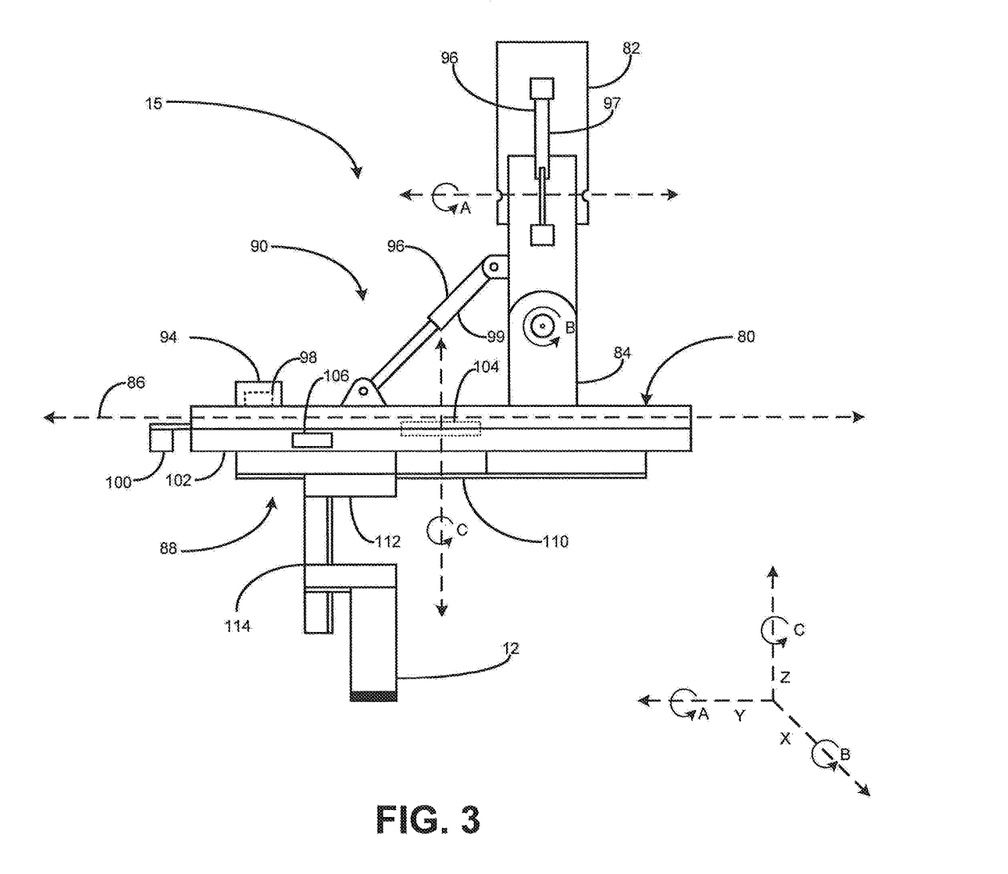
FIG. 3 is a side view of an example implement and associated effector for controlling the implement, which may be used in conjunction with the example machine and control system of FIGS. 1 and 2, in accordance with an embodiment of the present disclosure.
Figure 4:
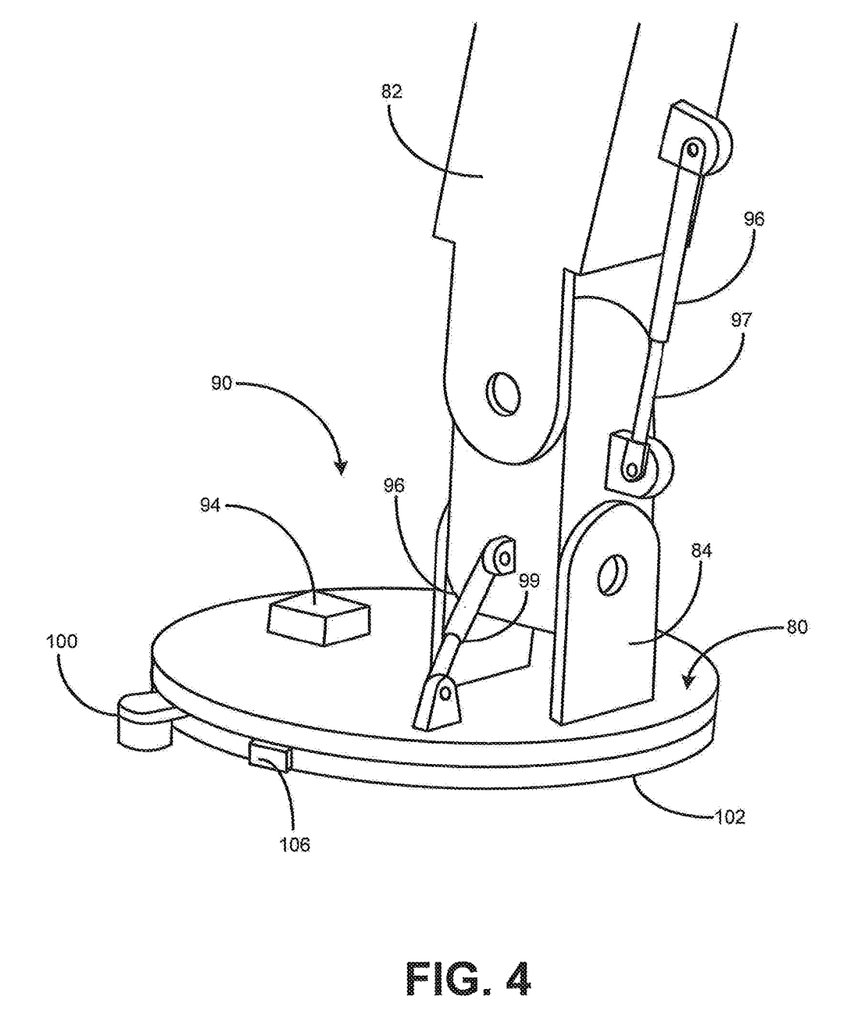
FIG. 4 is a three-dimensional, top-perspective view of the effector of FIG. 3, depicted showing elements of an orientation leveling system associated with the effector and, specifically, a base plate of the effector, in accordance with the embodiment of FIG. 3.
Figure 5:
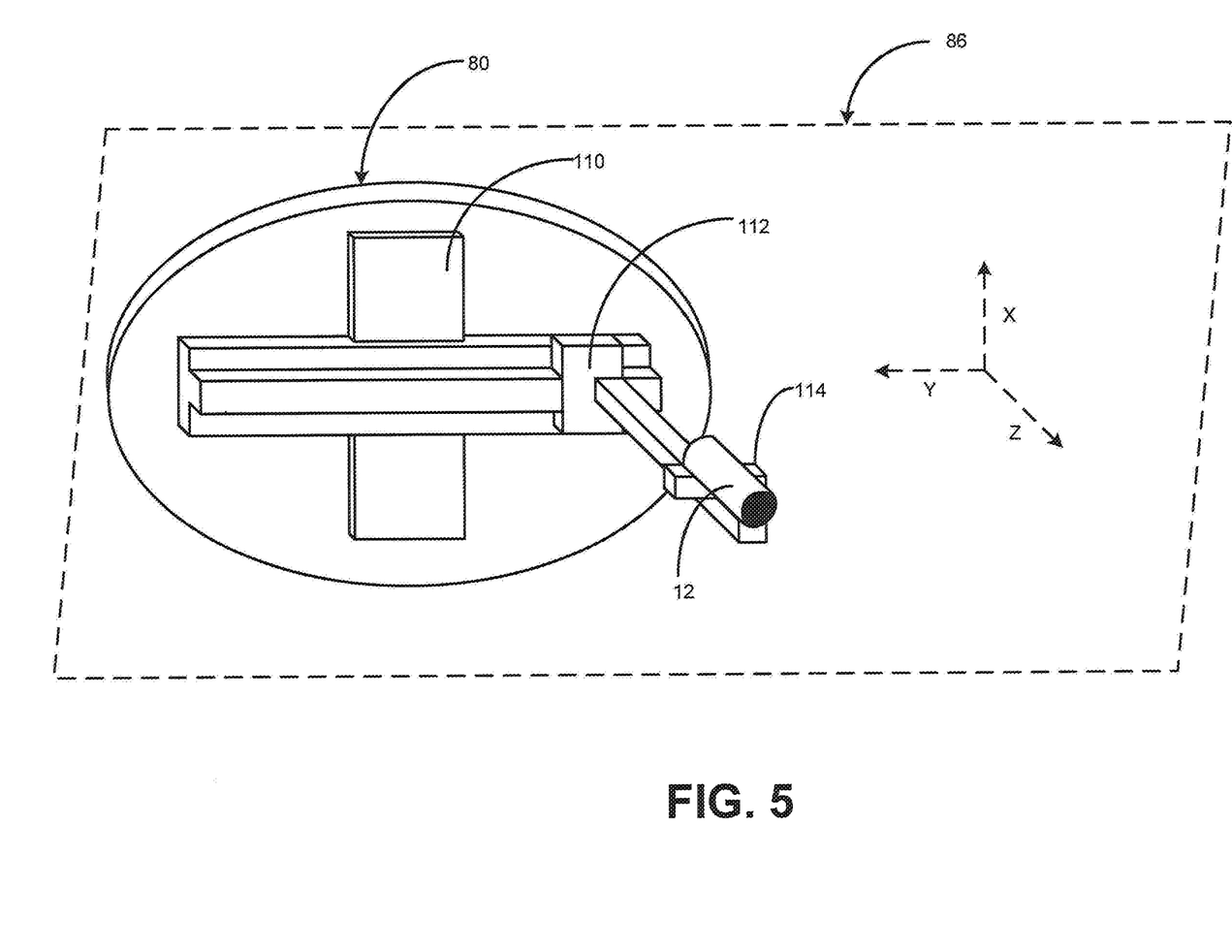
FIG. 5 is a three-dimensional, bottom-perspective view of the effector of FIG. 3, depicted showing elements of a multi-axis control system disposed underneath the base plate, in accordance with the embodiment of FIG. 2.

Turning now to FIGS. 3-5, the effector 15 and its associated elements are shown in greater detail. The effector 15 includes a base plate 80, which may be attached to the distal end 28 of the stick 26 of the machine 10. For attaching the base plate 80 to the distal end 28, the effector 15 may include a connecting linkage 82, which may be attached to the stick 26 by any attachment system known in the art (e.g., a pin joint). In some examples, the connecting linkage 82 may be attached to the base plate 80 via a control linkage 84, about which the base plate 80 and/or connecting linkage 82 can rotate.

When the effector 15 positions the implement 12 relative to the machine 10, the base plate 80 establishes a plate plane 86 (all planes and axes are denoted with dashed lines throughout the appended drawings). Orientation of the plate plane 86 alters with changes in the orientation of the base plate 80, caused by any motion of the base plate 80, including, but not limited to, motion from coarse movements of the machine 10, movements made by the effector 15, environmental factors (e.g., wind, precipitation, etc.), and the like. The base plate 80 may be utilized to provide a level base for a multi-axis control system 88, which may be utilized to each position the implement 12 relative to an axis relative to the plate plane 86.

To provide such a level base for the multi-axis control system 88, the effector 15 may include, or be otherwise associated with, an orientation leveling system 90 for leveling the base plane relative to the work surface 13. The orientation leveling system 90 is depicted graphically in the side view of FIG. 3 and top-perspective view of FIG. 4, while also being depicted schematically in the schematic diagram of the control system 30 of FIG. 2. "Level," as used herein, generally means that an object is substantially, horizontally parallel with respect to the Earth. More specifically, in the context of the effector 15, the base plate 80 is "level" with respect to the work surface 13, if the plate plane 86 is oriented such that the plate plane 86 is substantially parallel with a surface plane 92, in which the work surface 13 lies (an example, general, two-dimensional positioning of the surface plane 92 is depicted as a dashed line in FIG. 1).

The orientation leveling system 90 includes an orientation sensor 94, one or more plate actuators 96, and a leveling system controller 98. The orientation sensor 94 is configured to determine initial orientation information for the base plate 80. The orientation sensor 94 may be any sensor which may determine if an object is level with respect to the Earth, or any other ground surface. Such sensors which may be included in the orientation sensor 94 include, but are not limited to including, gyroscope sensors, accelerometers, global positioning system (GPS) sensors, and the like. The initial orientation information gathered by the orientation sensor 94 may include orientation information associated with the base plate 80 (e.g., angular position of the base plate 80 with respect to the Earth) and its associated plate plane 86, taken with respect to the worksite 13 and its associated surface plane 92. Therefore, the initial orientation information may include information as to whether or not the plate plane 86 is level with respect to the surface plane 92. Further, the initial orientation information may include information regarding variances between the current orientation of the base plate 80 and a generally level orientation of the base plate 80.

The initial orientation information may then be received by the leveling system controller 98. Using the initial orientation information, the leveling system controller 98 may determine if the plate plane 86 is substantially parallel with the surface plane 92. If, based on the initial orientation information, the plate plane 86 is not substantially parallel with the surface plane 92, the leveling system controller 98 may actuate the one or more plate actuators 96 to alter orientation of the base plate 80 such that the plate plane 86 is substantially parallel with the surface plane 92. Once the one or more plate actuators 96 have positioned the base plate 80 in this manner, the base plate 80 will be relatively level with respect to the work surface 13.

As shown in the depiction of FIG. 3, a first plate actuator 97, of the one or more plate actuators 96, may be configured to rotate the base plate 80 about an A-rotational axis and a second plate actuator 99 may be configured to rotate the base plate 80 about a B-rotational axis. The A and B-rotational axes are both disposed with respect to the plate plane 86. By rotating the base plate 80 about the A and B-rotational axes, the leveling control system 90 may, thereby, rotate the implement 12 about the A and B-rotational axes. As described herein, the orientation leveling system 90 may rotate the base plate 80 and, consequently, the implement 12 about the A and B-rotational axes to level the base plate 80 and implement 12 with respect to the work surface 13. While the depiction of FIGS. 3 and 4 show the first and second plate actuators 97, 99 used for leveling the base plate 80, any number of actuators may be used so long as they function to level the base plate 80 with respect to the work surface 13 or, more generally, with respect to the Earth.

While the leveling system controller 98 is depicted in FIG. 3 as embedded within the orientation sensor 94, the leveling system controller 98 is not necessarily embedded with the orientation sensor 94 and may be located anywhere on the base plate 80. Furthermore, the leveling system controller 98 need not be affixed to or otherwise physically attached to the base plate 80 or the effector 15, so long as the leveling system controller 98 is in operative communication with both the orientation sensor 94 and the one or more plate actuators 96. Also, while the leveling system controller 98 is depicted, and can be, a controller separate from the controller 50, it is certainly possible that the leveling system controller 98 may be implemented by any number of hardware or software elements within the controller 50, so long as it performs the functions described above.

Further, additional elements may be included in the effector 15 to allow for the implement 12 and/or the multi-axis control system 88 to rotate about a C-rotational axis, with respect to the plate plane 86. For example, the effector 15 may include a rotary actuator 100 which is configured to rotate the implement 12, via rotating the multi-axis control system 88, relative to the base plate 80. The rotary actuator 100 may rotate the multi-axis control system 88 in response to instructions from the controller 50. In some examples, the multi-axis control system 88 may be affixed to a rotational plate 102, which is substantially parallel with and affixed to the base plate 80. In such examples, the rotary actuator 100 may be configured to rotate the rotational plate 102, with respect to the base plate 80, in response to instructions from the controller 50. Furthermore, in the example embodiment including the rotational plate 102, the rotational plate 102 may be connected to the base plate 80 via a slewing bearing 104 (denoted in dotted lines in FIG. 3), which enables rotation of the rotational plate 102 relative to the base plate 80. Additionally, a rotational sensor 106 may be included and be associated with the rotational plate 102. The rotational sensor 106 may be configured for determining rotational positioning of the rotational plate 102, therefore determining rotational positioning of the multi-axis control system 88, relative to the base plate 80.

Turning now to FIG. 5, and with continued reference to FIG. 3, the multi-axis control system 88 is shown in detail from a three-dimensional, bottom perspective view. The multi-axis control system 88 shown and the axes, about which the multi-axis control system 88 positions the implement 12, are merely exemplary. While the multi-axis control system 88 is shown as a plurality of linear actuators in the present embodiment, alternatively, the multi-axis control system 88 may be embodied by any positioner or positioning system that can position the implement 12 along multiple axes, with respect to the plate plane 86.

As shown, the multi-axis control system 88 may include a plurality of actuators, including, but not limited to including, an x-axis actuator 110, a y-axis actuator 112, and a z-axis actuator 114. X, Y, and Z axes are depicted in FIGS. 3 and 5 and are disposed relative to the plate plane 86. The x-axis actuator 110, as shown, may position the y-axis actuator 112 along the X-axis, while the y-axis actuator 112 may position the z-axis actuator 114 about the Y-axis, and the z-axis actuator 114 positions the implement 12 about the Z-axis. As the x, y, and z-actuators 110, 112, 114 are all connected to position the implement 12 in conjunction, the x-axis actuator 110, therefore, positions the implement 12 about the X-axis and the y-axis actuator 112, therefore, positions the implement 12 about the Y-axis.

However, this specific configuration of actuators and axes is certainly non-limiting and any combination of actuators positioning the implement 12 about two or more axes is certainly possible. Further, while all of the x, y, and z-axis actuators 110, 112, 114 are shown as simple, linear actuators, such actuators 110, 112, and 114 may be any actuator suitable for positioning the implement 12 about an axis relative to the plate plane 86.

The multi-axis control system 88 may receive instructions for positioning the implement 12 from the controller 50. Such control instructions may be based on, for example, the implement control plan 74. Because the effector 15 includes the orientation leveling system 90, the effector 15 may provide a level rotational base, with respect to the work surface 13, from which the multi-axis control system 88 may operate.

INDUSTRIAL APPLICABILITY

In general, the foregoing disclosure finds utility in various industries using control systems for implements functioning in conjunction with machines and, more specifically, to implement control systems for machines that utilize orientation leveling systems. As shown above, the control system 30 may be employed for control of an excavator-type machine 10; however, the systems and methods of the present disclosure may be applied to any work machines performing a task such as, but not limited to, additive construction, loading, compacting, lifting, brushing, and the like. Further, such machines may include one or more implements to be controlled by the present disclosure's systems and methods, such implements may include, but are not limited to including, additive construction implements, extruders, buckets compactors, forked lifting devices, brushes, grapples, cutters, shears, blades, breakers, hammers, augers, and the like. By utilizing orientation control systems in implement control, the disclosed systems and methods may provide simplified control for an implement of a machine, such as the implement 12 of the machine 10, by providing a level base for functions of the implement 12.

Figure 6:
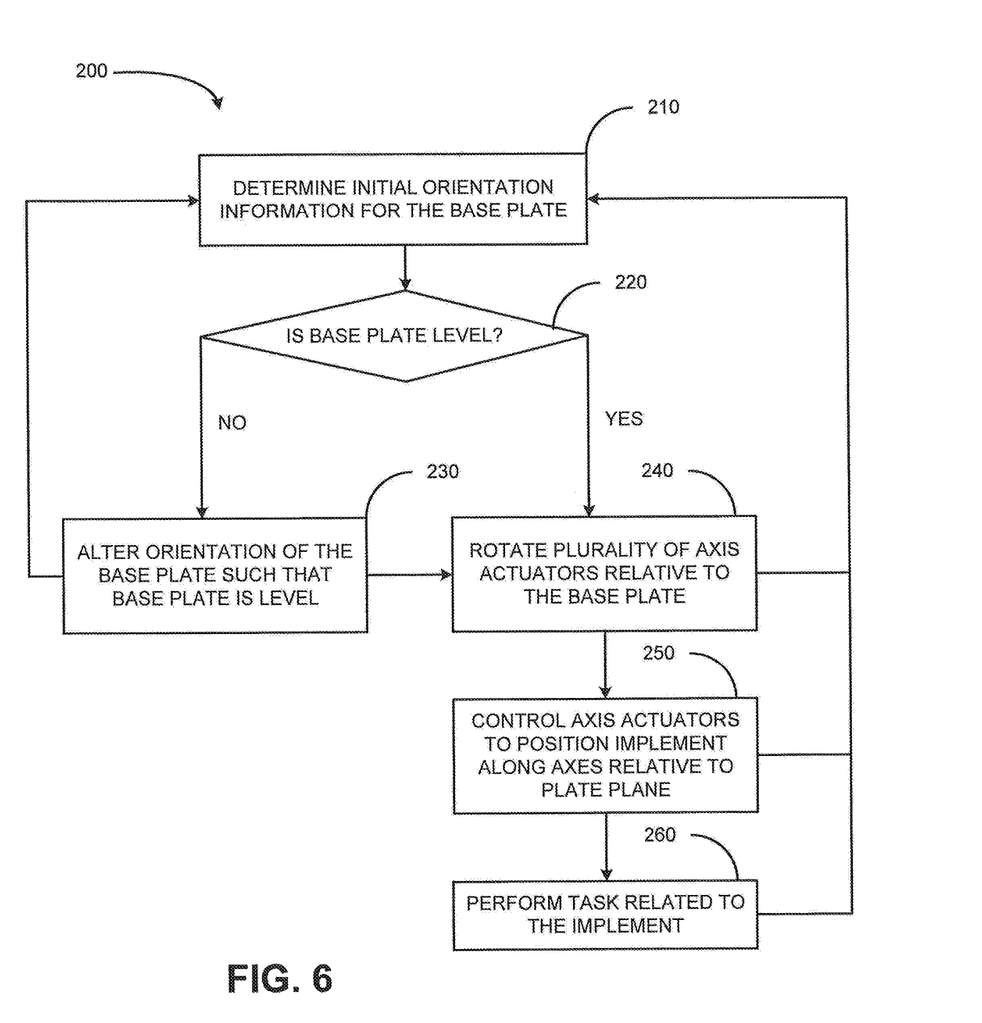
FIG. 6 is a flow chart representative of a method for controlling an implement of a machine, in accordance with the present disclosure.

To that end, FIG. 6 illustrates a flowchart for an example method 200 for controlling the implement 12 of the machine 10, which utilizes the effector 15 and, more specifically, the orientation leveling system 90. The method 200 may begin at block 210, wherein the orientation sensor 94 determines initial orientation information for the base plate 80. At decision 220, the method 200 continues by determining, based on the initial orientation information, if the plate plane 86, associated with the base plate 80, is substantially parallel with the surface plane 92 of the work surface 13. The determining step of decision 220 may be performed by one or both of the leveling system controller 98 and the controller 50.

If the base plate 80 is indeed level, because the plate plane 86 and the surface plane 92 are substantially parallel, then the method 200 may continue to block 240. However, if the base plate 80 is not level, then the method 200 may proceed to block 230, wherein orientation of the base plate 80 is altered, such that the plate plane 86 is substantially parallel with the surface plane 92, in which the work surface 13 lies. Such alterations may be made by controlling one or more of the plate actuators 96 to alter the orientation of the base plate 80 such that the plate plane 86 is substantially parallel with the surface plane 92. Control of the plate actuators 96 may be executed by one or both of the leveling system controller 98 and the controller 50. Once the base plate 80 is level, then the method 200 may continue to block 240 and/or the method 200 may return to 210 to continuously monitor the orientation of the base plate 80.

By utilizing the orientation leveling system 90 to provide a level base for the multi-axis control system 88 and the implement 12, the systems, methods, and apparatus of the present disclosure may simplify control of an implement in situations wherein very precise implement control is desired. Rather than using a complex robot, or other cost prohibitive equipment, to precisely position the implement 12 about three rotational axes and three linear axes, the effector 15 can accomplish similar precise motion by reducing the need for constant control about two of the rotational axes. Such control is reduced because the orientation leveling system 90 maintains a level base for the multi-axis control system 88.

With the base plate 80 level, the method 200 may continue to blocks 240, 250, and 260. While depicted sequentially, blocks 240, 250, and 260 may be performed in any order and may all also return to 210 in a manner such that the method 200 continues to monitor orientation of the base plate 80. At block 240, the method 200 may include rotating the multi-axis control system 88, by the rotary actuator 100, in response to instructions from the controller 50. In some examples, the step rotating the multi-axis control system 88 is performed by rotating the rotational plate 102, using the rotary actuator 100, in response to instructions from the controller 50.

Further, at block 250, the method 200 includes controlling the multi-axis control system 88 to position the implement 12 relative to the plate plane 86, in response to instructions from the controller 50. By utilizing the multi-axis control system 88, simplified axis actuators may be used, which may be more robust than prior used, precise positioners, such as a multi-axis robot. At block 260, the implement 12 may be used to perform its associated task.

In some examples, the implement 12 may be an additive construction implement and the task performed at block 260 may include disposing materials in accordance with the implement control plan 74, which may be an additive construction plan, once the implement 12 is positioned via the multi-axis control system 88. Further, in such examples, the implement 12 may be controlled by the multi-axis control system 88 to position the implement in accordance with the implement control plan 74.

As described above, the control system 30, effector 15, and the method 200 may be particularly useful when the implement 12 is an additive manufacturing implement. While the disclosed systems and methods are useful in additive manufacturing applications, the disclosed systems and methods are certainly not limited to use in additive manufacturing applications.

It will be appreciated that the present disclosure provides control systems for implements of machines, which utilize orientation leveling systems. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for an implement associated with a machine, the machine operating on a work surface, the work surface lying in a surface plane, the control system comprising:
- a base plate attached to the machine, the base plate establishing a plate plane and orientation of the plate plane alters with changes in orientation of the base plate;
- an orientation leveling system including:
  - an orientation sensor configured to determine initial orientation information for the base plate, the initial orientation information being relative to the surface plane;
  - one or more plate actuators for altering orientation of the base plate; and
  - a first electronic controller configured to receive the initial orientation information from the orientation sensor, determine if the plate plane is substantially parallel with the surface plane, and actuate the one or more plate actuators to alter orientation of the base plate to position the base plate such that the plate plane is substantially parallel with the surface plane, if, based on the initial orientation information, the plate plane is not substantially parallel with the surface plane; and
- a multi-axis control system, the multi-axis control system including:
  - a plurality of axis actuators, each of the plurality of axis actuators configured to position the implement along an axis relative to the plate plane; and
  - a second electronic controller configured to actuate the plurality of axis actuators to position the implement.

2. The control system of claim 1, further comprising a rotary actuator configured to rotate the multi-axis control system, relative to the base plate, in response to instructions from the second controller.

3. The control system of claim 2, further including a rotational plate, the rotational plate disposed substantially parallel with the base plate and connected to the base plate.

4. The control system of claim 3, wherein the rotational plate is connected to the base plate via a slewing bearing, the slewing bearing enabling rotation of the rotational plate relative to the base plate.

5. The control system of claim 3, further including a rotational sensor operatively associated with the rotational plate and configured to determine rotational positioning of the rotational plate, relative to the base plate.

6. The control system of claim 1, wherein the plurality of axis actuators includes an x-axis actuator for positioning the implement about an x-axis, a y-axis actuator for positioning the implement about a y-axis, and a z-axis actuator for positioning the implement about a z-axis, wherein each of the x-axis, the y-axis, and the z-axis are disposed relative to the plate plane.

7. The control system of claim 6, wherein the x-axis actuator, the y-axis actuator, and the z-axis actuator are linear actuators.

8. The control system of claim 1, wherein the implement is an additive construction implement.

9. The control system of claim 8, wherein the a second electronic controller of the multi-axis control system is configured to actuate the plurality of axis actuators to position the additive construction implement in accordance with an additive construction plan.

10. The control system of claim 1, wherein the orientation sensor includes one or more of an accelerometer, a gyroscope, and a global positioning system (GPS).

11. An effector for controlling an additive construction implement during an additive construction operation on a work surface, the work surface lying in a surface plane, the effector comprising:
- a base plate for attachment to a machine, the base plate establishing a plate plane and orientation of the plate plane alters with changes in orientation of the base plate;
- an orientation sensor configured to determine initial orientation information for the base plate, the initial orientation information being relative to the work surface;
- one or more plate actuators for altering orientation of the base plate;
- an electronic controller configured to receive the initial orientation information from the orientation sensor, determine if the plate plane is substantially parallel with the surface plane, and actuate the one or more plate actuators to alter orientation of the base plate to position the base plate such that the plate plane is substantially parallel with the surface plane, if, based on the initial orientation information, the plate plane is not substantially parallel with the surface plane;
- a plurality of axis actuators, each of the plurality of axis actuators configured to position the additive construction implement along an axis relative to the plate plane.

12. The effector of claim 11, wherein the machine is a construction machine including a crane, the effector further includes a connecting linkage configured for connecting the effector to the crane of the machine, and the construction machine is configured to utilize the additive construction implement, via the effector, for additive construction of a structure.

13. The effector of claim 11, further comprising:
- a rotational plate connected to the base plate on a first surface and connected to the plurality of axis actuators on a second surface; and
- a rotary actuator configured to rotate the rotational plate and plurality of axis actuators relative to the base plate.

14. The effector of claim 13, wherein the rotational plate is connected to the base plate via a slewing bearing, the slewing bearing enabling rotation of the rotational plate relative to the base plate.

15. The effector of claim 13, further comprising a rotational sensor operatively associated with the rotational plate and configured to determine rotational positioning of the rotational plate, relative to the base plate.

16. A method for controlling an implement associated with a machine during an operation, utilizing an effector which connects the implement to the machine, the effector including a base plate that establishes a plate plane, orientation of the plate plane altering with changes in orientation of the base plate, one or more plate actuators, and a plurality of axis actuators, the machine operating on a work surface, the work surface lying in a surface plane, the method comprising:
- determining, using an orientation sensor operatively associated with the base plate, initial orientation information for the base plate;
- determining, using one or more electronic controllers, if the plate plane is substantially parallel with the surface plane based on the initial orientation information;
- controlling, using the one or more electronic controllers, the one or more plate actuators to alter the orientation of the base plate such that the plate plane is substantially parallel with the surface plane, if the plate plane is not substantially parallel with the surface plane; and controlling, using the one or more electronic controllers, the plurality of axis actuators to position the implement, each of the plurality of axis actuators positioning the implement along an axis relative to the plate plane.

17. The method of claim 16, wherein the effector further includes a rotary actuator, the method further comprising rotating the plurality of axis actuators, relative to the base plate, by the rotary actuator in response to instructions from the one or more electronic controllers.

18. The method of claim 17, wherein the effector further includes a rotational plate, connected to the base plate and disposed substantially parallel to the base plate, wherein the axis actuators are connected to the rotational plate, and wherein rotating the plurality of axis actuators includes rotating the rotational plate using the rotary actuators in response to instructions from the one or more electronic controllers.

19. The method of claim 16, wherein the implement is an additive construction implement and controlling the plurality of axis actuators includes controlling the plurality of axis actuators to position the additive construction implement based on an additive construction plan.

20. The method of claim 19, further comprising disposing materials in accordance with the additive construction plan once the implement is positioned, via the axis actuators, in accordance with the additive construction plan.

* * * * *